(12) United States Patent
Schyndel

(10) Patent No.: US 6,336,031 B1
(45) Date of Patent: Jan. 1, 2002

(54) WIRELESS DATA TRANSMISSION OVER QUASI-STATIC ELECTRIC POTENTIAL FIELDS

(75) Inventor: Andre Van Schyndel, Kanata (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/218,426

(22) Filed: Dec. 22, 1998

(51) Int. Cl.$^7$ .................................................... H04B 5/00
(52) U.S. Cl. ............................ 455/41; 455/304; 455/334; 340/870.37
(58) Field of Search .............................. 455/41, 209, 304, 455/334; 340/870.37

(56) References Cited

U.S. PATENT DOCUMENTS

| | | |
|---|---|---|
| 3,617,890 A | 11/1971 | Kurauchi et al. |
| 3,898,565 A | 8/1975 | Takeuchi et al. |
| 4,061,972 A | 12/1977 | Burgess |
| 4,117,271 A | 9/1978 | Teeter et al. |
| 4,281,321 A | 7/1981 | Narlow et al. |
| 4,356,477 A | 10/1982 | Vandebult |
| 4,584,707 A | 4/1986 | Goldberg et al. |
| 4,642,786 A | 2/1987 | Hansen |
| 4,763,340 A | 8/1988 | Yoneda et al. |
| 4,905,307 A * | 2/1990 | Frank ........................ 455/209 |
| 5,247,261 A | 9/1993 | Gershenfeld |
| 5,437,057 A | 7/1995 | Richley et al. |
| 5,625,883 A | 4/1997 | Leyten et al. |
| 5,771,438 A | 6/1998 | Palermo et al. |
| 5,796,827 A | 8/1998 | Coppersmith et al. |

FOREIGN PATENT DOCUMENTS

| | | |
|---|---|---|
| EP | 0 843 425 A2 | 5/1998 |
| WO | WO 96/36134 | 11/1996 |

OTHER PUBLICATIONS

Personal Area Networks: Near–field intrabody communication, by T.G. Zimmerman, IBM Systems Journal, vol. 35, Nos. 3&4, 1996.

* cited by examiner

Primary Examiner—Vivian Chang
Assistant Examiner—J K Moore
(74) Attorney, Agent, or Firm—Jeff Measures

(57) ABSTRACT

A transmitter includes a pair of electrodes separated in space, and transmit circuitry for varying the voltage difference applied across the electrodes in order to vary the spatial gradient of the electric potential field generated by the transmitter in accordance with the data to be transmitted. The receiver includes a pair of electrodes separated in space and receive circuitry which detects these variations in the quasi-electrostatic potential field in order to receive the transmitted data. Thus the receive electronics unit includes a detector connected to said electrodes for producing a signal which varies as the spatial gradient of the electric potential field across the receive electrodes varies but which does not depend on changes in potential within any given electrode.

15 Claims, 12 Drawing Sheets

WIRELESS DATA TRANSMISSION OVER QUASI-STATIC ELECTRIC POTENTIAL FIELDS

FIELD OF THE INVENTION

The present invention relates to the short range wireless transmission of data.

BACKGROUND OF THE INVENTION

Connectionless (i.e., wireless) transmission of analog and digital signals has previously been accomplished using:

Radio (including LF, HF, VHF, SHF and microwave links);
Optical (such as laser or IR—used in most television remotes and IRDA);
Acoustics (usually ultrasound);
Capacitive coupling; and
Magnetic coupling Radio transmissions diminish relatively slowly with distance. They are also subject to fades and wave interference. Radio transmissions are highly regulated as to their frequencies and radiated energy. Furthermore, as radio transmissions radiate energy, they require significant power.

Optical transmissions are typically highly directional in nature. They are also stopped by objects in the transmission path. This directional aspect is often double edged; the directional aspect is often desirable to avoid interference, but this makes orientation and line of sight considerations important, and is often cumbersome. Also, these systems require significant power.

Ultrasound transmission systems are expensive and also use significant power.

The wireless data transmission method or the invention is distinct from those listed above, but is more closely associated with Capacitive coupling and Magnetic coupling, as the transmission is dominated by near field interaction as opposed to the far field radiation of the transmission methods which rely on the propagation of electromagnetic waves to transmit data.

Magnetic coupling systems are known in which a transmitter generates a varying magnetic field which can be detected by a receiver in order to transmit data. Examples include U.S. Pat. No. 3,898,565, to Takeuchi et al, U.S. Pat. No. 5,437,057 to Richley et al., and U.S. Pat. No. 5,771,438 to Palermo et al. However, these systems all require a significant power source in order to generate the magnetic field.

In U.S. Pat. No. 5,796,827 to Coppersmith et al, PCT application Ser. No. 96/36134 to Gershenfeld et al., and in a an article by T. G. Zimmerman, "Personal Area Networks: Near-field intrabody communication", IBM Systems Journal vol 35, Numbers 3 and 4, 1996, pages 1–9, data transmission is accomplished by close range capacitive coupling of a person to the receiver electrode. When the electric potential (or voltage) of the person is modulated with respect to ground, a voltage (or current depending on the detector details) is induced on the receiver electrode with respect to ground. The ground is required to complete the circuit between the transmitter and receiver in this system. While useful for particular applications, the method requires some coupling of the user to ground, for the signal at the receiver is measured between the capacitive pickup electrode and ground. While useful in many applications that provide a suitable coupling to ground, the technique is not applicable to transmitters that are at a floating potential with respect to the receiver ground.

Thus, there exists a need for a wireless transmission system which overcomes the limitations of the above described techniques.

SUMMARY OF THE INVENTION

It is an object of the present invention to provide a low range, low power wireless transmission system. Advantageously, such a system can be built at low cost.

The invention comprises a wireless data link using the spatial gradient of quasi-static electric potentials as the medium. By quasi-static, we mean that the time variance in the electric potential is sufficiently small that electrostatic assumptions can be made. In other words, even though the electric potentials are deliberately varied in time (in order to transmit the data), any electromagnetic waves which are produced by such time variances in the electric potentials can be effectively ignored (e.g., the amount of radiated energy is well below the limits established by the FCC), and electrostatic assumptions can be made. Another feature of the quasi-static nature of the electric potentials discussed herein is that the distance between the transmitter and receiver is very much less than the ratio of the speed of light to the operating frequency (i.e. very much less than the wavelengths corresponding to the maximum frequencies of the transmission). However, the distance between the transmitter and receiver can be large compared to the size of the transmitting and receiving electrodes (the "antennae"). Devices using the invention can operate in base band, or they can transmit a modulated carrier signal. Amplitude, frequency and phase modulation can be used.

The transmitter creates an electric scalar potential field with a time varying spatial gradient and the receiver is sensitive to the spatial gradient of this potential. In most practical applications, the transmitter will form a time varying dipole electric potential field by varying the voltage on electrodes of a given geometry. The receiver will sense the spatial gradient of the electric potential field by measuring the signal induced between two or more electrodes separated by some distance. This induced signal can be the current needed to hold the receiver electrodes at a constant potential. However, as an alternative the receiver can measure the voltage induced between the receive electrodes.

The invention is especially advantageous for low cost and low power applications which require short range, low data rate transmission. However, the invention is not limited to these type of systems, as various design trade-offs can be made between the range, data rate, cost, antenna size and power consumption parameters.

In accordance with a broad aspect of the present invention there is provided a method of data transmission comprising:

varying a voltage difference applied across a plurality of transmit electrodes at such a rate that the resulting electric potential field varies in a quasi-static manner, wherein the variation in said voltage difference depends on the data to be transmitted; and producing a receive output signal which varies with a signal induced between a plurality of receive electrodes by said quasi-static variations in said electric potential field.

In accordance with another aspect of the present invention there is provided a wireless transmission system comprising:

a wireless transmitter; and
a wireless receiver,
wherein said transmitter comprises:
a plurality of transmit electrodes separated in space;

means for varying a voltage difference across said electrodes at a rate that the resulting electric potential field varies in a quasi-static manner, wherein the variation in said voltage difference depends on the data to be transmitted; and wherein said receiver comprises:
a plurality of receive electrodes separated in space,
means for producing a receive output signal which varies with a signal induced between said receive electrodes by the varying quasi-static electric potential field produced by said transmit electrodes.

In accordance with yet another aspect of the present invention there is provided a transmitter for transmitting data by slowly varying the spatial gradient of an electric potential field comprising:
at least two transmit electrodes;
means for changing the voltage potential between said electrodes to vary the spatial gradient of an electric potential field generated by said transmitter;
means for controlling said means for changing in order to vary said spatial gradient to transmit data.

In accordance with yet another aspect of the present invention there is provided a receiver comprising:
at least two electrodes separated in space; and a detector connected to said electrodes for producing a signal which varies as the spatial gradient of the electric potential field across the receive electrodes varies.

BRIEF DESCRIPTION OF THE DRAWINGS

The present invention, together with further objects and advantages thereof will be further understood from the following description of the preferred embodiments with reference to the drawings in which.

DETAILED DESCRIPTION OF THE PREFERRED EMBODIMENTS

We will discuss the preferred embodiments of the invention with reference to a an example prototype system which uses a two electrode antenna (whose major moment is dipole) for both the receiver and transmitter. Antennas with other multipole moments can be designed.

Figure 1:
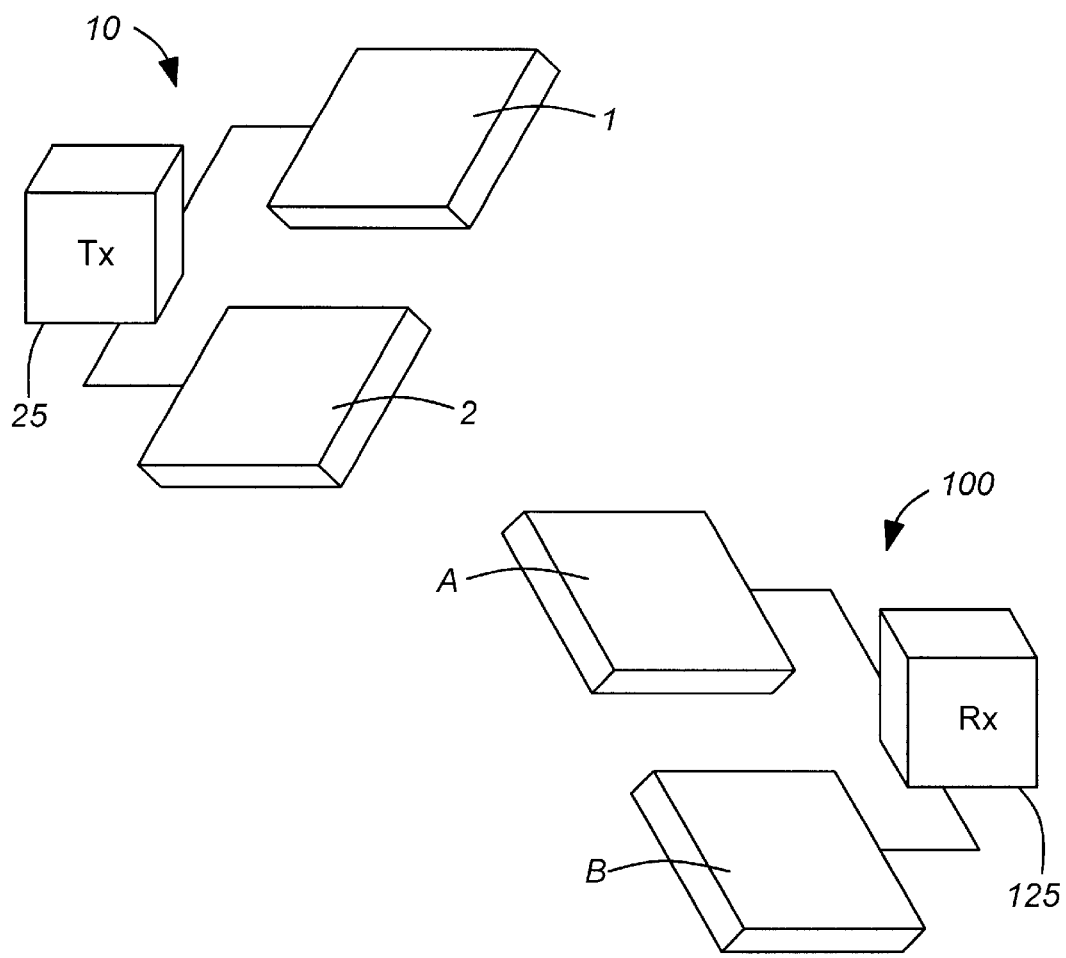
FIG. 1 is a block diagram showing a transmitter and receiver, according to one embodiment of the invention.

FIG. 1 illustrates a transmitter 10 and a receiver 100. The transmitter 10 comprises transmit electrodes 1 and 2 connected to a transmit electronics unit 25. The receiver 100 comprises receive electrodes A and B connected to a receive electronics unit 125. Note that this figure is not drawn to scale. In a prototype transmitter each of the electrodes comprises a square sheet of copper, approximately 2 cm on a side, with a thickness approximately one half of a millimeter. The electrodes are separated by a constant distance of approximately 5 milimeters. The two electrodes are aligned in a plane. The receiver geometry is similar in design. This geometry was chosen so that the transmitter can fit into an employee badge, or credit card sized device. Note that the size, shape, separation and orientation of the electrodes can vary, and other conductors can be used.

The transmit electronics varies the voltage difference between the two transmit electrodes, wherein the variation in said voltage difference depends on the data to be transmitted. Thus a "quasi-electrostatic" potential field is varied in order to transmit data. Stated another way, an electric potential field is varied in a quasi-static manner. At any given instant in time, the spatial gradient of this quasi-static electric potential field is defined by the variation of its amplitude in space. Due to the quasi-static nature of the potential field, this variation is predominantly caused by the structure of the transmit antenna (and the voltage difference applied across it), rather than any wave attribute. Receive electrodes (for example receiver electrodes A and B) separated in space can be used as part of a system which produces a signal which varies as the electric potential field varies between the receive electrodes. Note that as we are dealing with quasi-static electric potential fields, the potential is substantially constant at each point within any given receive electrode.

Therefore the transmitter can effectively transmit a signal to the receiver by varying the spatial gradient of this electric potential field in accordance with the data to be transmitted. The receiver detects these variations in the quasi-electrostatic potential field in order to receive the transmitted data. Thus the receive electronics unit includes a detector connected to said electrodes for producing a signal which varies as the spatial gradient of the electric potential field across the receive electrodes varies but which does not depend on changes in potential within any given electrode.

Note that the electric potential field generated by the transmit electrodes is subject to the intrinsic dipole directional characteristics of the electrode arrangement. However, conductors in close proximity to the receive electrodes can distort the electrostatic field around the receiver. Thus in practice this can result in a transmission system which is largely independent of direction. Thus, in most cases, the receiver can be located anywhere in the vicinity of the transmitter, and can be oriented in any direction. Furthermore, one or both of the units may be slowly moving, provided that their relative speed is slow enough that the signal induced in the receiver due to motion through the spatially varying field varies more slowly than the data rate.

Such a transmission system will have a range limited by the magnitude of the electric potential gradient at any given distance from the transmitter. This magnitude will depend on the voltage difference between the transmitter electrodes and the distance from the transmitter electrodes. Note that the field strength will diminish rapidly with distance. For an antenna arrangement as described, the electric potential gradient (and hence the signal on the receiver electrodes) will be proportional to the inverse square of the distance between the transmitter and receiver (for distances significantly larger than the characteristic size of the transmitter electrodes). Thus the effective range of this system generally diminishes with distance faster than radio, optical, or acoustic systems which have signal strengths which are typically inversely proportional to the range (where the range is large compared to the antenna size). Thus, this system will typically be used for relatively short-range applications.

Advantageously, the herein described transmission system requires relatively low power, as little power is required by the "antenna" (i.e., the transmit electrodes). As discussed, spatial variations in the electric potential are produced by placing a voltage between two or more electrodes separated in space. The load that this "antenna" presents to the transmit circuitry is essentially all capacitive and can be of the order of picofarads or less. This antenna feature is distinctly different from radio transmission systems whose antenna has a resistive component which radiates significant power into space. This antenna feature also requires less power than optical transmission systems (whose "antenna" is usually represented by current through a light emitting diode), magnetic coupling systems (whose "antenna" is a length of wire coiled around a high permeability core) and acoustic transmission systems (whose "antenna" is an acoustic transducer).

We will first discuss a specific embodiment of the invention with reference to a prototype transmitter (shown in FIGS. 4, 5, and 6) and a corresponding prototype receiver (shown in FIGS. 7–11). We will then discuss what is believed to be a theory of the invention in order for the reader to build other systems with differing ranges, powers, data rates etc.

We will now describe a prototype transmitter and receiver which addresses the need for a low power identification tag for people or objects, according to an embodiment of the invention. Typical applications include employee badges, car/house keys as well as automatic security locks for workstations, telephones, voice mail systems, etc. Conventional solutions include physical keys, bar codes, passwords, active integrated circuits (in "smart cards" and employee badges), and short range RF transmitters. In general, these systems involve the use of an identification code or tag to provide access to a system, and only allow access to the system once the tag has been received. For example a security badge will identify that a user has authority to enter a room. Typically the badge needs to be placed in contact with a reader. This is often time consuming and cumbersome. It would be advantageous for such a system to have the following features:

1. Secure identification of the tag
2. Clearly defined range (e.g. identification closer than 2 meters but not greater than 3 meters)
3. Low power consumption transmitters (e.g. continuous operation for years on a watch battery)
4. Operation in large ranges of environmental parameters (such as temperature, humidity, and pressure)
5. Data rates of a few hundred bits per second
6. Data repetition rates faster than 1 time per second
7. Low cost
8. Easy to mass produce
9. Transmission over an unregulated link (so that a licence is not required)
10. Simultaneous operation of many devices in close proximity.
11. Small in size.

Preferable attributes are:
1. Nominal range of 0.5–5 meters;
2. Easily programmable ID number; and
3. Encryption.

A prototype transmitter/receiver was built and tested to transmit such a tag which satisfies these attributes. Such a transmitter can be incorporated in an employee badge or "smart card".

Figure 4:
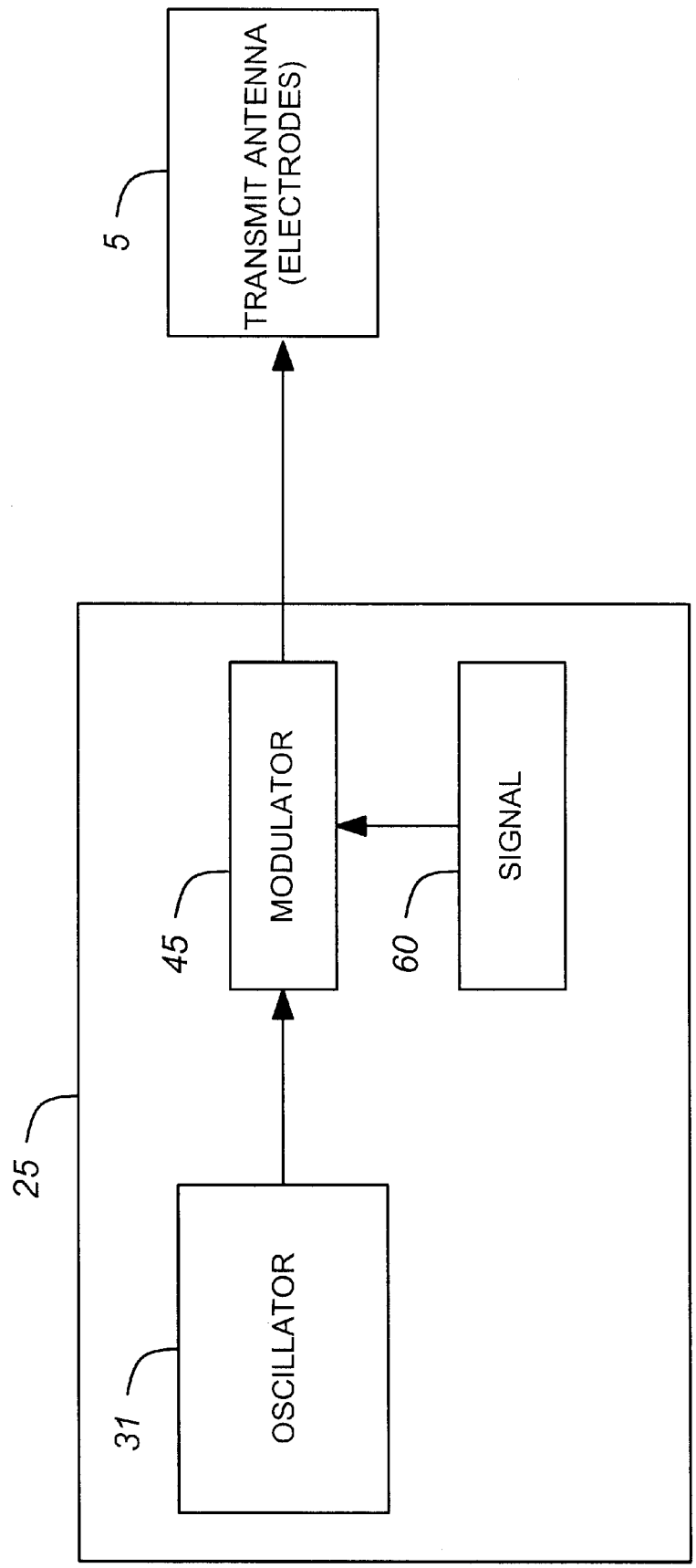
FIG. 4 shows a block diagram of a transmitter according to an embodiment of the invention.

The prototype transmitter/receiver specifications include the following:
Transmitter voltage supply: 3V battery
Transmitter average current drain: 20 $\mu$A
Data rate: 500 bits per second
Repetition rate: Continuous
Carrier frequency: 32.768 kHz
Range: 70 cm A block diagram of a transmitter is shown in FIG. 4 according to an embodiment of the invention. FIG. 4 is a block diagram of the transmitter 10 of FIG. 1, which includes a pair of transmit electrodes (1 and 2 as shown in FIG. 1) which are collectively called the Transmit antenna 5 coupled to the transmit electronics unit 25. In this embodiment, the data is transmitted by modulating a carrier, in order to increase the signal to noise ratio of the signal which is received and demodulated at the receiver, as compared to transmitting the data directly. Thus the transmit electronics unit 25 includes an oscillator 31 for producing the carrier signal, and a modulator 45 for modulating the carrier with the data signal 60.

Figure 5:
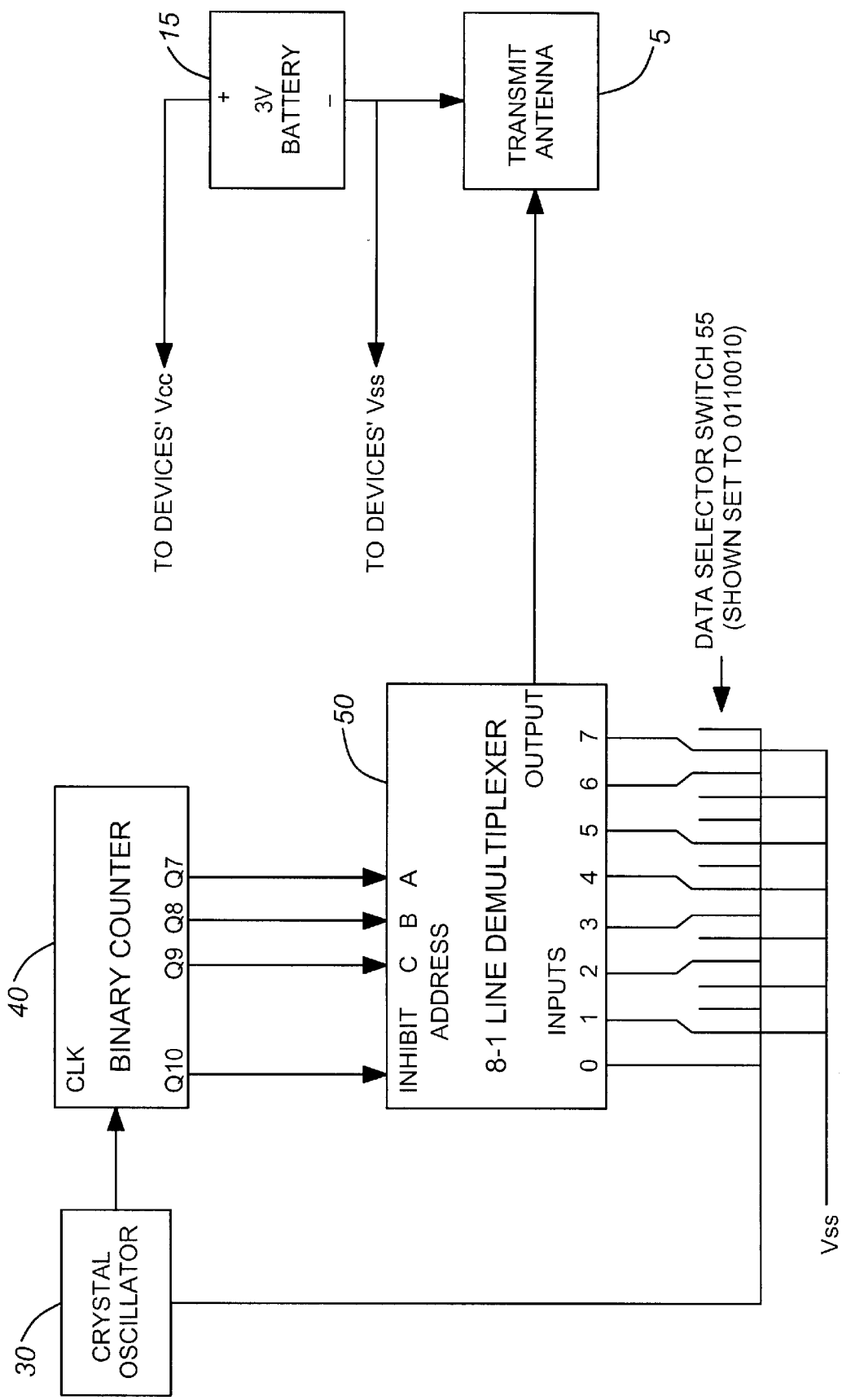
FIG. 5 shows a block diagram of a prototype transmitter.

A block diagram showing details of a prototype transmitter which is simple and inexpensive in design is shown in FIG. 5 according to an embodiment of the invention. This transmitter includes Transmit antenna 5, a battery (3V) 15, a watch crystal which forms part of a 32.768 kHz clock oscillator 30, a CMOS binary counter 40, an 8 to 1 line CMOS demultiplexer 50 connected to a data selector switch 55 and a few discrete components (which are not shown in the block diagram, but are shown in the circuit diagram of FIG. 6).

As can be seen, the clock oscillator produces a 32.768 kHz carrier which is effectively modulated by the demultiplexer to produce the signal to be transmitted. In this simple prototype, a simple 7 bit tag is transmitted to the receiver. Thus a simple selector switch is used to select a 7 bit data word to be transmitted. In this embodiment this tag is repeatedly transmitted. In order for the receiver to easily identify the tag, each tag is separated by a delay and a start bit.

The lower frequencies from the $7^{th}$, $8^{th}$ and $9^{th}$ stages of the counter 40 serve as addresses for the CMOS demultiplexer 50. The demultiplexer data inputs are switched to the clock (for a binary 1 datum) or Vss (for a binary 0 datum), by the data selector switch 55, which is shown in the figures to select an example data word of 0110010. A logical 1 on the $10^{th}$ stage is used to disable the demultiplexer providing a fixed length delay between transmitted words. This delay and a "start bit" (provided by connecting the $0^{th}$ demultiplexer data input to the clock) allows for easy data parsing in the receiver. The output of the demultiplexer is applied to one of the transmitter antenna electrodes. The other antenna electrode is connected to the Vss terminal of the battery 15. The carrier frequency is therefore 100% amplitude modulated by the data to be transmitted (as determined by the data selector switch 55) as the voltage potential between the two electrodes will be zero for a binary 0 datum, or oscillating at the clock frequency between zero volts and Vcc for a binary 1 datum. Because the fastest changing address line to the demultiplexer is the $7^{th}$ stage of the counter, 64 clock cycles pass for every data bit transferred. Hence each zero datum will result in a pause (ie zero voltage difference across the electrodes) of 64 clock cycles, and each one datum will result in 64 pulses (at the carrier frequency). Ideally therefore, the signal to noise ratio in the receiver can be a factor of $\sqrt{64}=8$ better than if a single pulse was sent per datum.

Thus, as can be seen, the voltage potential between electrodes 1 and 2 varies over time according to the data to be transmitted. This varying voltage potential produces variations in the spatial gradient of the quasi-static electric potential field generated by the transmitter. Note that this prototype was built to repeatedly transmit a tag, and thus uses a data selector switch to determine the tag. Of course the transmitter can be modified to transmit a more complicated data signal, and the data to be transmitted can be encrypted for security.

Figure 6:
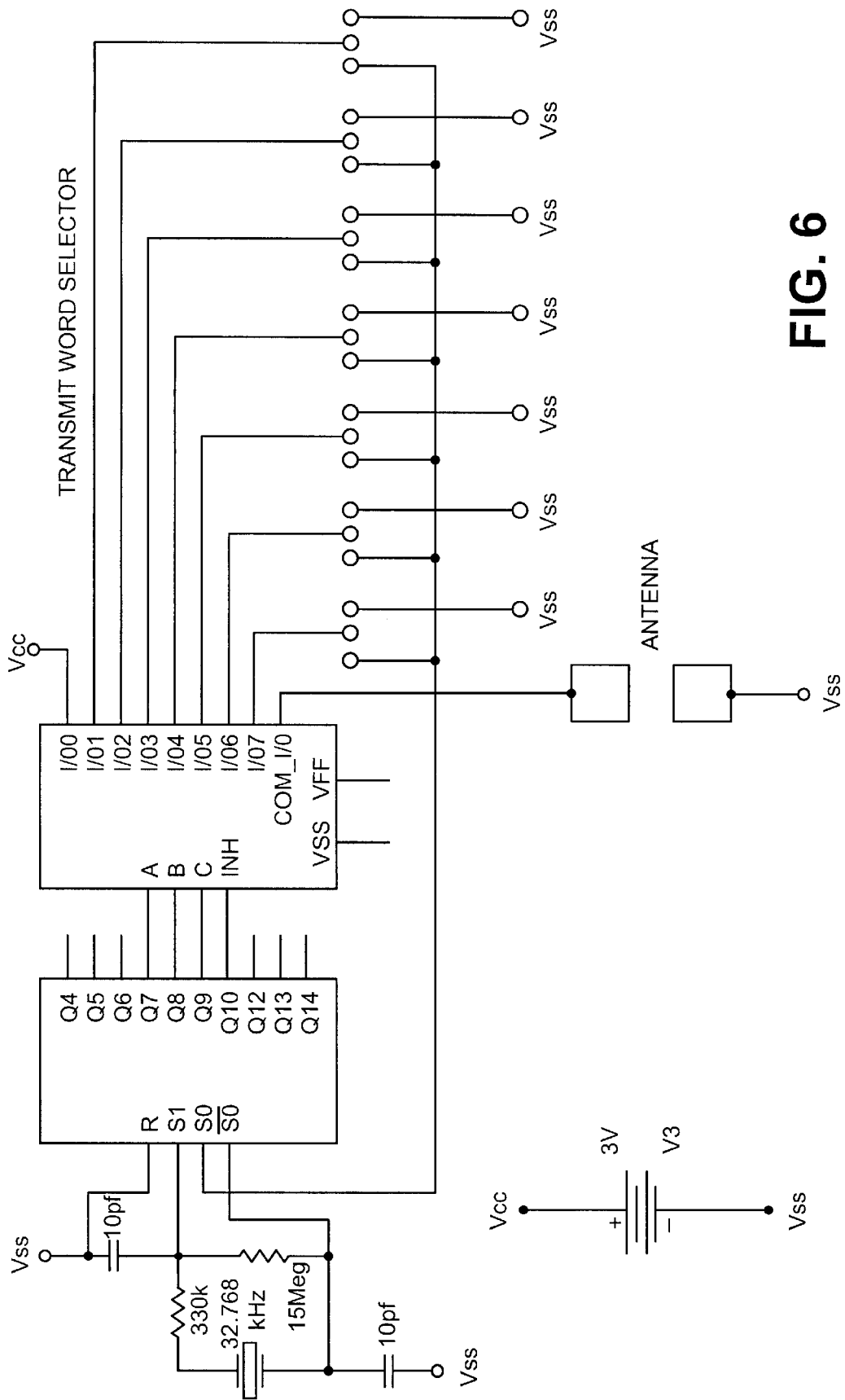
FIG. 6 shows a circuit diagram of the prototype transmitter.

A circuit diagram for the prototype is shown in FIG. 6, showing the elements used in the prototype transmitter.

Figure 7:
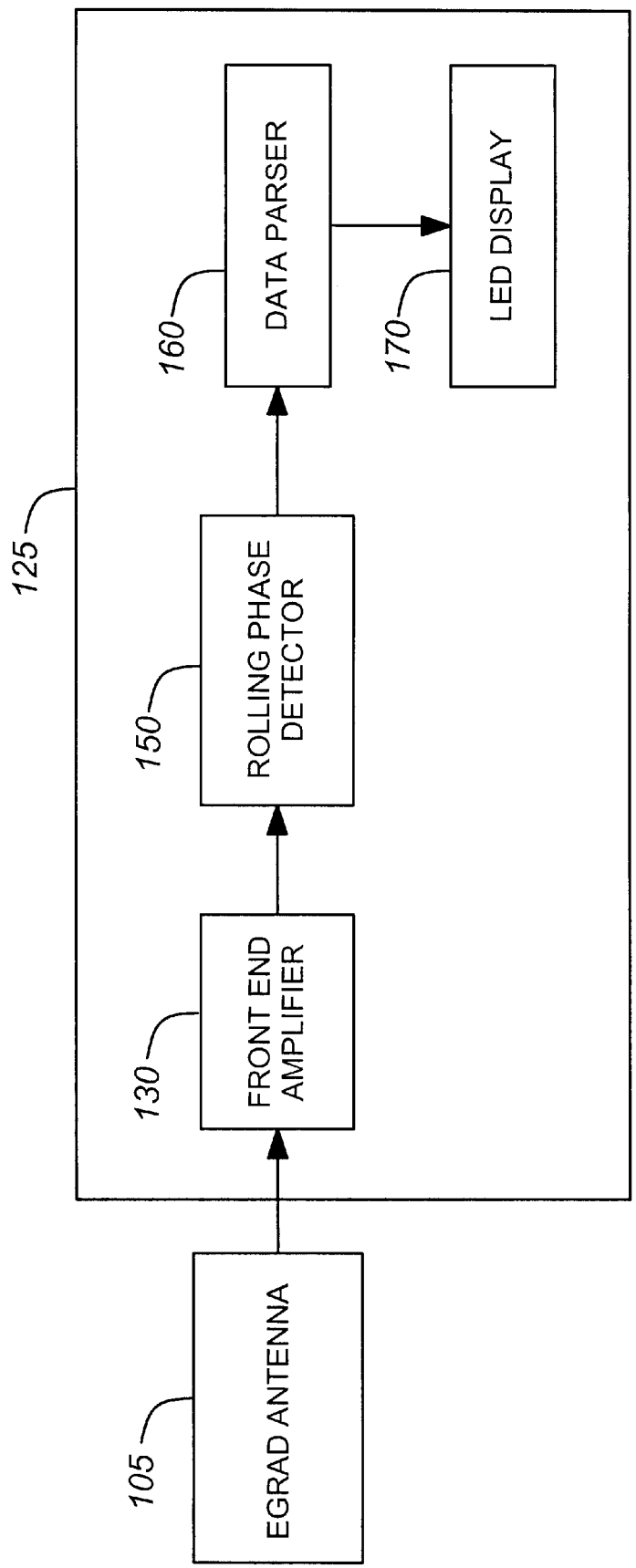
FIG. 7 shows a block diagram of the prototype receiver
Figure 8:
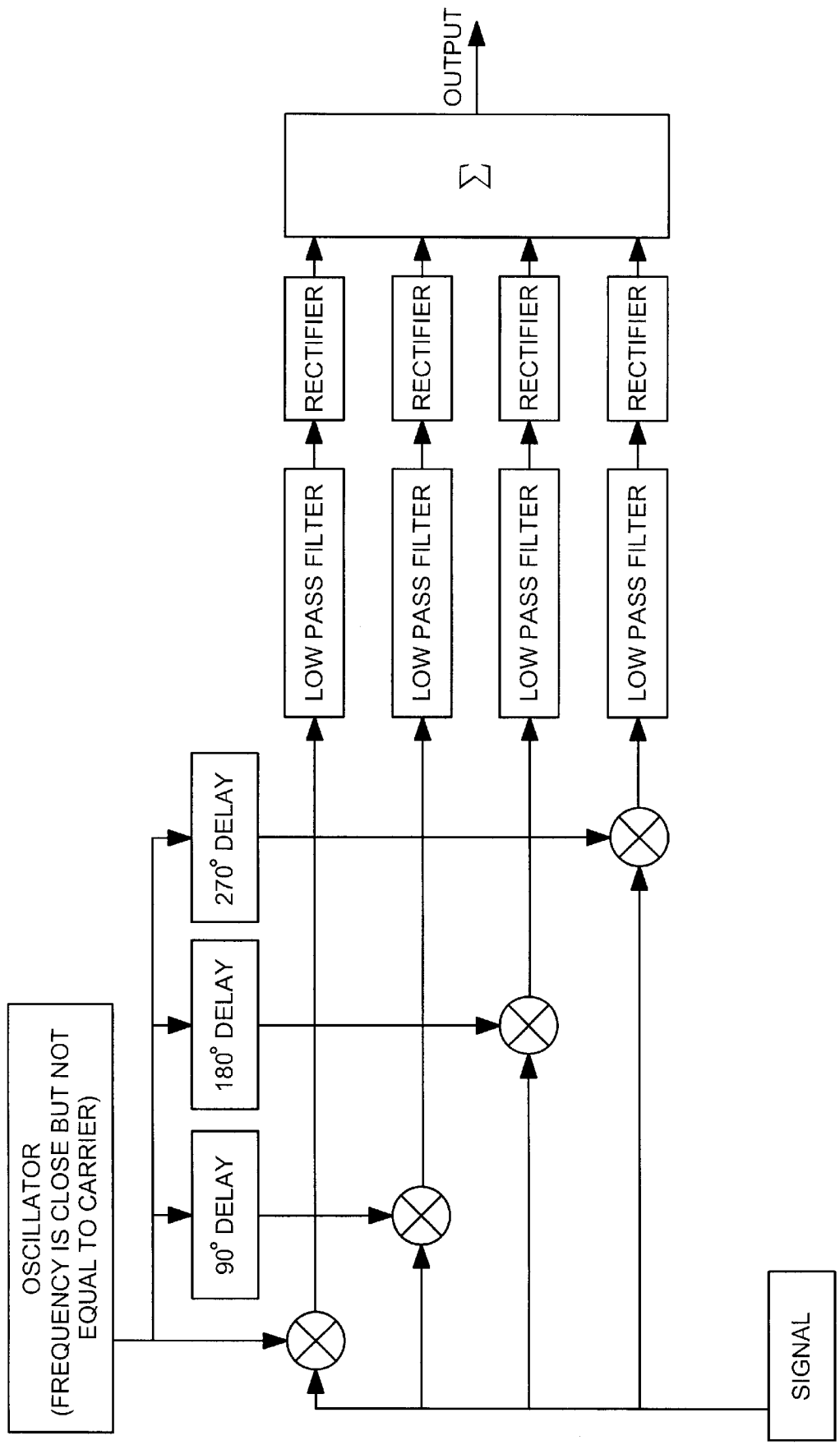
FIG. 8 a block diagram of a rolling phase detector.
Figure 9:
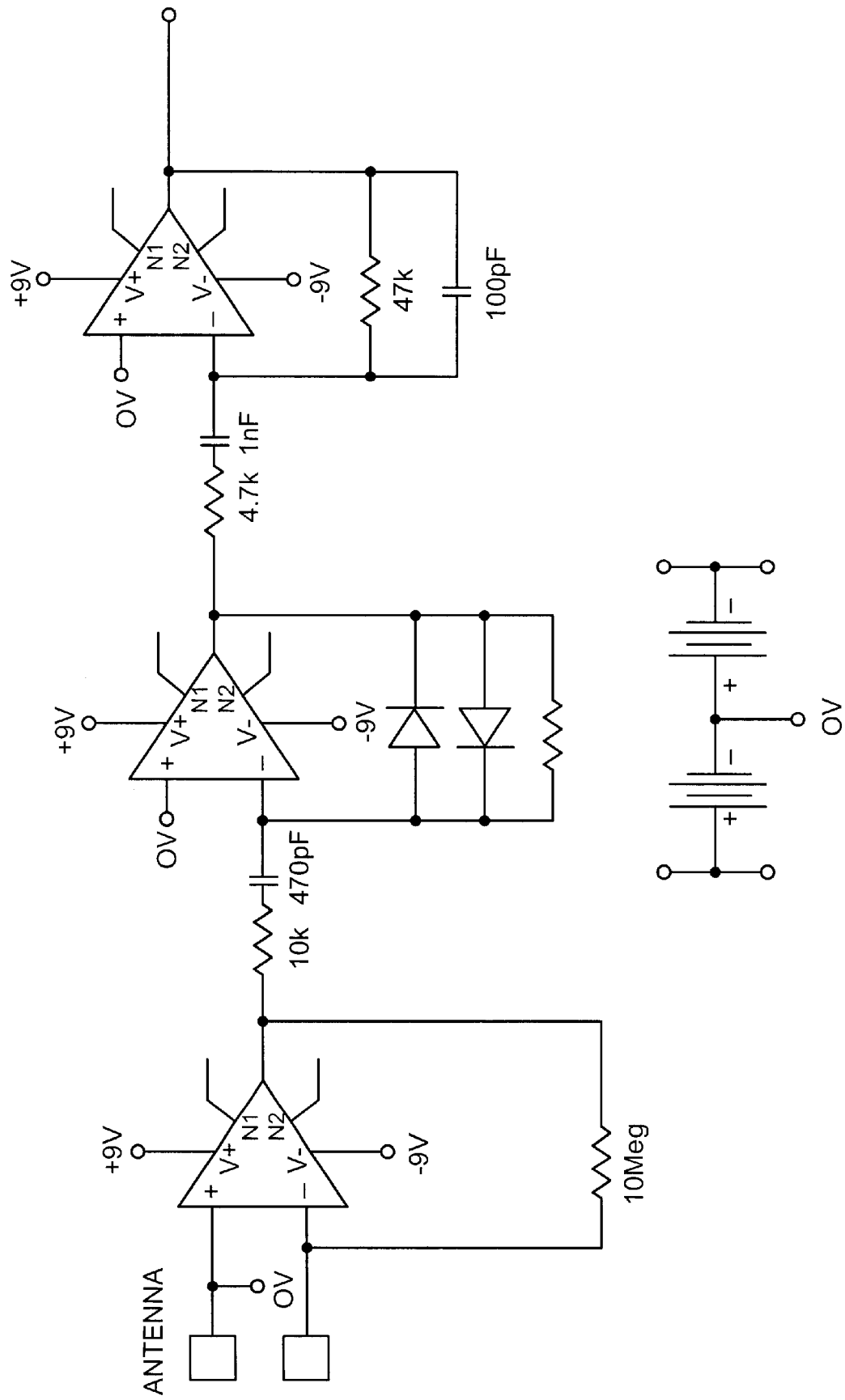
FIG. 9 shows a circuit diagram of the front end of the prototype receiver.
Figure 10:
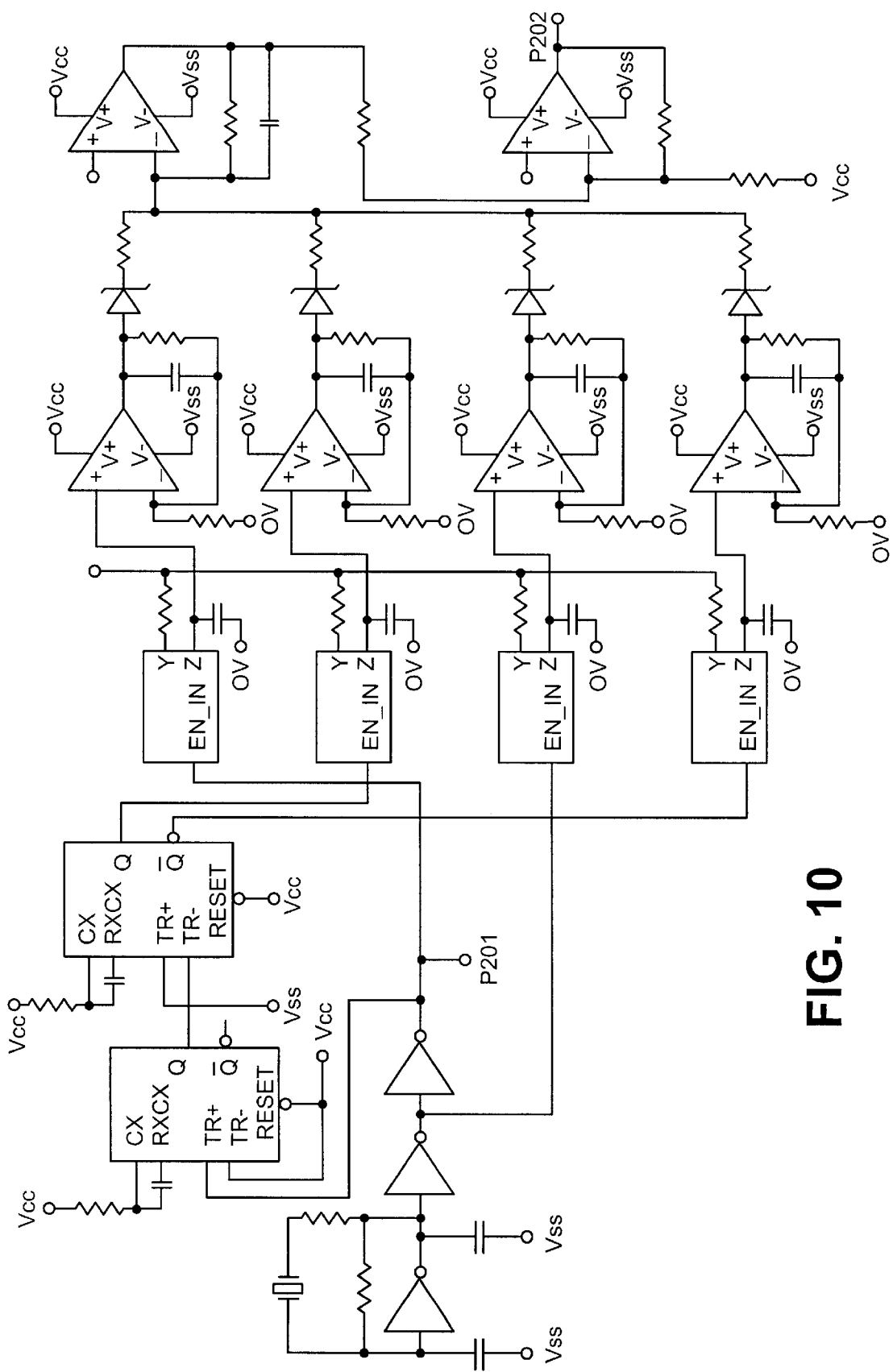
FIG. 10 shows a circuit diagram of the rolling phase detector of the prototype receiver.
Figure 11:
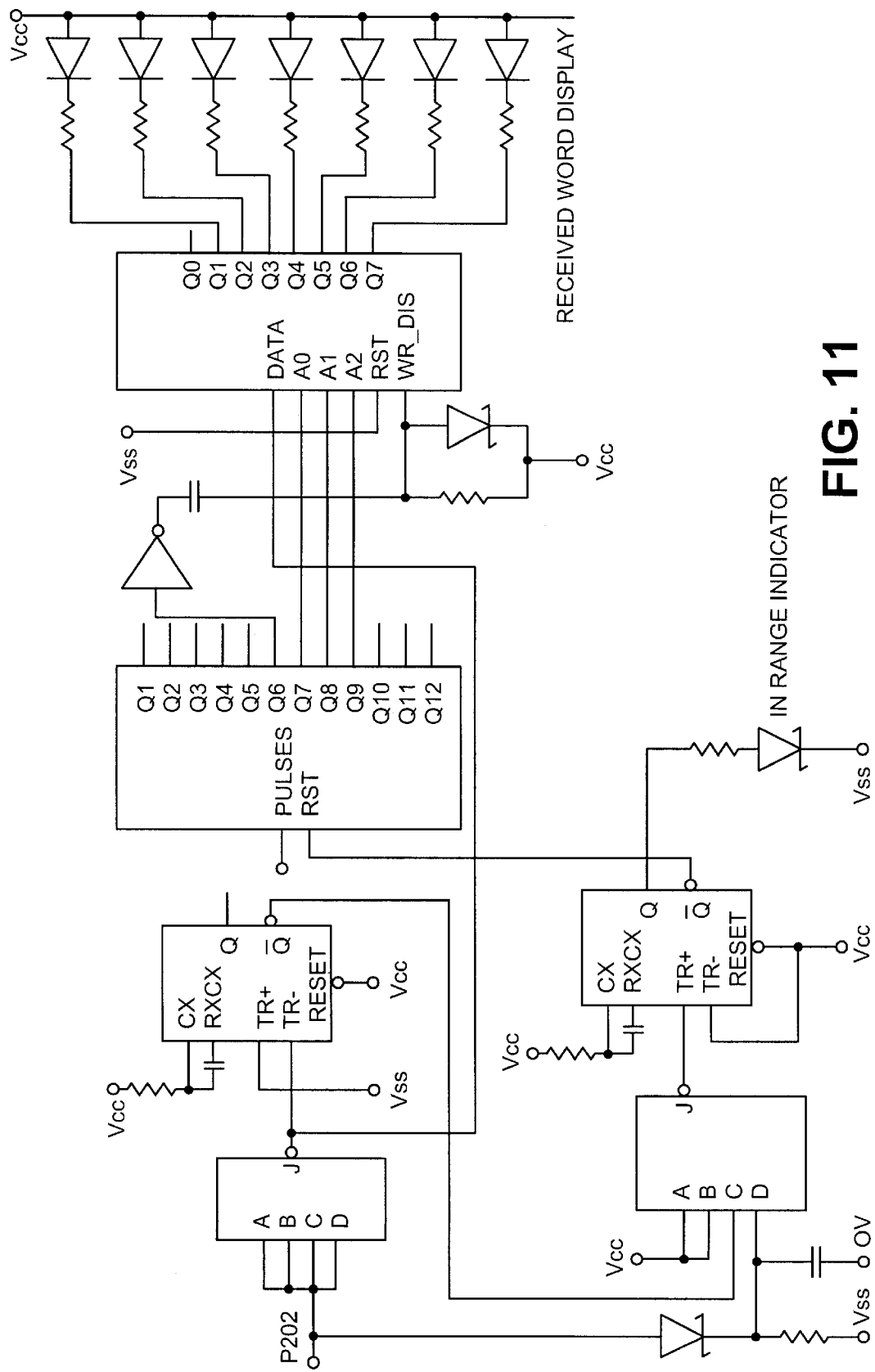
FIG. 11 shows a circuit diagram of the data parser of the prototype receiver.

We will now discuss the prototype receiver built for receiving the tag transmitted by the prototype transmitter. A block diagram of such a receiver is shown in FIG. 7, is a block diagram of the receiver 100 of FIG. 1, which includes a pair of receive electrodes (A and B as shown in FIG. 1) which are collectively called the Receive antenna 105 coupled to a detector (also called the receive electronics unit) 125. In this embodiment, the receive electronics unit 125 includes a front end amplifier 130 (the details of which are shown in FIG. 9), a rolling phase detector (the details of which are shown in FIGS. 8 and 10), and a data parser 160 for displaying the transmitted tag via an LED display 170 (the details of which are shown in FIG. 11).

The receiver front-end amplifier 130 is of the transimpedance type. A circuit diagram of the front end amplifier used in the prototype receiver, including a detector connected to said electrodes for producing a signal which varies as the spatial gradient of the electric potential field across the receive electrodes varies, is shown in FIG. 9. The output voltage of the first stage is 10 MΩ times the current needed to keep the potential between the antenna electrodes constant. For example, a 10 mV output would correspond to a current of 1 nA into the receiver antenna electrodes. The subsequent stages are amplifiers and filters constructed to reject signals not close to the transmitter clock frequency of 32.768 kHz. One of the amplifiers has parallel diodes in the feedback loop. This is a convenient method to provide compression. Automatic Gain Control (AGC) would be more desirable, especially if more than one transmitter were present.

DETAILED DESCRIPTION OF THE PROTOTYPE ROLLING PHASE DETECTOR

Good amplitude detection can be obtained if a local oscillator could be phase locked to the transmitted carrier. The signal could then be multiplied or "mixed" with the local oscillator and then low pass filtered to provide the modulating signal without the carrier. These techniques are well known to those skilled in the art of radio demodulation.

When the signal to noise ratio is small, this synchronization is not always easily achieved. In the prototype, a rolling phase detector is used to demodulate the data signal from the carrier without synchronizing the oscillators. Because of the accuracy in the crystals, an unsynchronized local oscillator could match the frequency of the transmitter to one part in 10,000 or better. From the local oscillator, signals is phase shifted at 90, 180, and 270 degrees are generated, for example by inverters and a monostable multivibrator. These phase-delayed signals can also be generated with analog components. All four oscillator signals are multiplied by the input signal and then low pass filtered. For simplicity in the prototype implementation, the resulting signals are rectified and added to produce the demodulated output signal. Although not shown, it should be noted that the signal to noise ratio can be improved by also adding in the rectified inverted signals of the original four phase sum. Note that as an alternative to rectifying, squaring and adding the resulting signals would effectively demodulate the input signal because $\sin^2 x + \cos^2 x = 1$. In this alternative, the circuit can be simplified by eliminating two of the phase shifters.

Note that the pass band of the low pass filters should be larger than the maximum expected difference between oscillator frequencies (which can be determined from the oscillator specifiations). Note that the decreasing the pass band of the low pass filters, increases the signal to noise ratio of the demodulated signal. Therefore the more closely the frequency of the receive oscillator matches the frequency of the transmit oscillator, the better the potential signal to noise ratio.

DETAILED DESCRIPTION OF THE DATA PARSER

The output from the rolling phase detector is processed by a Schmidtt trigger comparator, which produces a digital signal corresponding to a 1 or 0 datum sent by the transmitter.

The data parser is triggered by the fixed length delay (in this example a digital signal of 8 zeros) followed by a start bit of "1". This sequence starts a binary counter clocked by the local oscillator. Because the local oscillator's frequency is so close to the transmitter's, the latter stages of the binary counter become essentially synchronized to that of the transmitter. The $7^{th}$ to $9^{th}$ stages provide an address for the data. The final stage of the data parser is an 8 bit addressable latch. The $7^{th}$ to $9^{th}$ stages of the counter serve as the address for the latch, and the current data from the rolling phase detector is the datum to be latched. Inverting the 6th stage of the binary counter and using analog components to change the down transition into a negative digital pulse provides a latching signal. The output stages of the latch are connected to LED's through ballast resistors to display the received data word.

Now that we have discussed the workings of a simple prototype system, we will now discuss the physics of the coupling between the transmitter and the receiver. This will allow a reader to understand how the transmission performance depends on the antenna geometry, range, voltage, frequency, so that trade-offs can be made for other applications.

Because the transmissions are quasi-static in nature, the impedance between any two electrodes (receiver, transmitter, or any other conductor) is capacitive, and therefore the signal induced between receive electrodes results from capacitive coupling between the transmit electrodes and the receive electrodes when the electrodes are placed in proximity to each other. For any given geometry, these capacitances are constant. Thus, for known capacitances we can construct an equivalent circuit which can predict the coupling between the transmitter and the receiver, as well as the effective antenna impedances. In general, if the geometry changes (for example one of the transmitter or receiver moves), the circuit remains the same, but the values of the capacitances changes accordingly.

Figure 2:
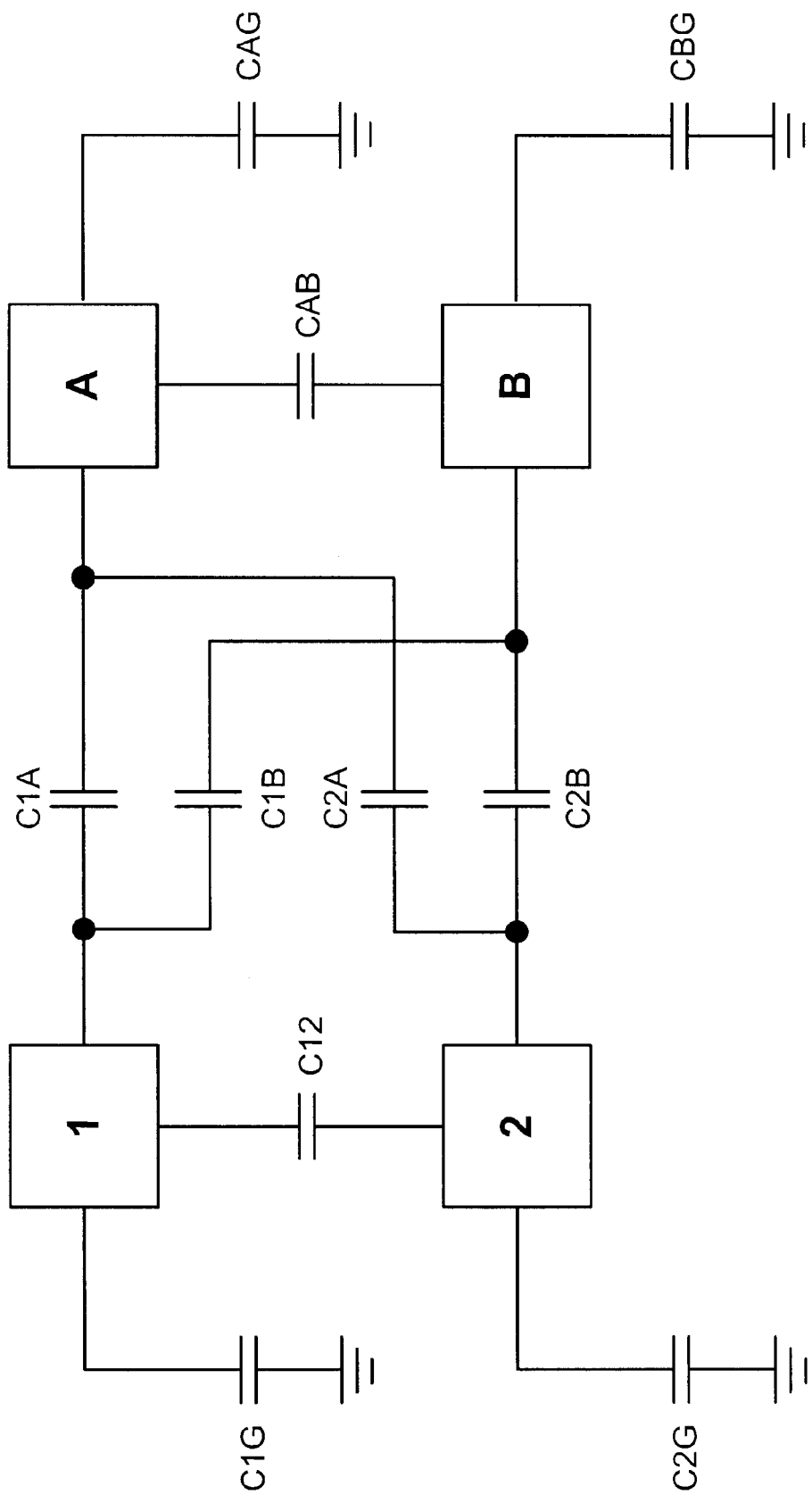
FIG. 2 is a block diagram showing a Capacitance equivalent circuit.

As an example, the equivalent circuit for the two electrode prototype system discussed is shown in FIG. 2. When a signal is applied to the transmitter electrodes, this circuit determines the source impedance and signal level at the receiver electrodes. The circuit can be solved analytically, or numerically with a circuit solver such as PSpice.

Generally, a simplified circuit can be assumed as some of the elements in the circuit have negligible effect. This is usually true for the capacitances between the transmitter electrodes and between each transmitter electrode and ground (i.e., C12, C1G and C2G in FIG. 2). These capacitances usually have negligible effect because they represent a negligible load to the transmit electronics unit 25 and can be ignored. In addition, if the receiver front end senses the current needed to hold the receiver electrodes at a constant potential, these electrodes can be considered to be connected together. Furthermore, if this constant potential is the ground potential, then the receive electrodes can be consider to be connected to ground. Thus the capacitances between the receiver electrodes and between each receiver electrode and ground (CAB, CAG and CBG in FIG. 2) will have negligible effect and can be ignored.

Figure 3:
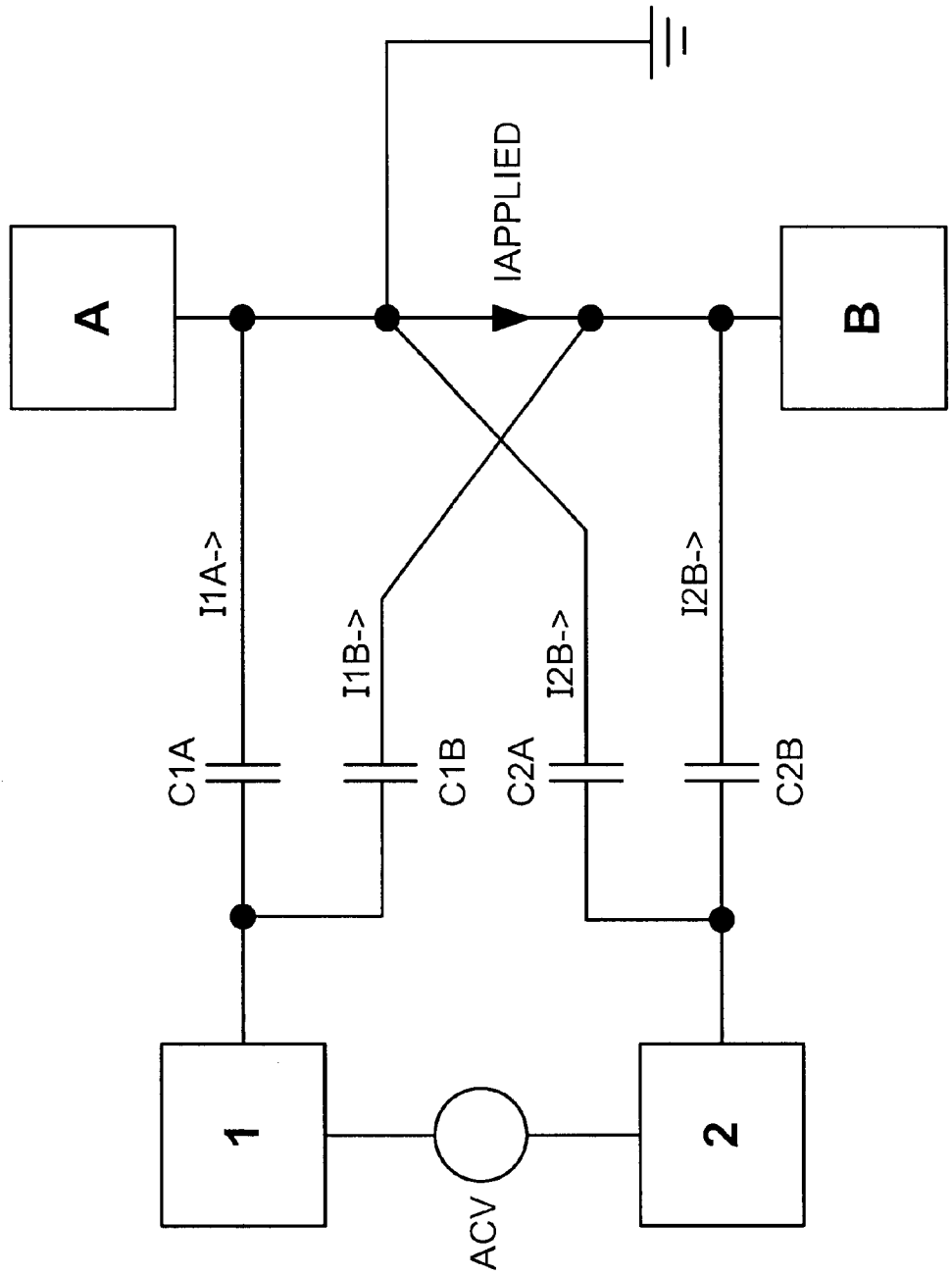
FIG. 3 Simplified circuit for the example in FIG. 2.

If these simplifications are applied to the example in FIG. 2, the simple circuit shown in FIG. 3 results. According to one embodiment, the induced signal is detected by determining the current needed to hold the receiver electrodes at a constant potential. It is clear from FIG. 3 that this current is given by:

$$I_{applied} = (I_{1A} - I_{2A}) - (I_{1B} - I_{2B}) \quad (1)$$

or, from elementary circuit theory for a sinusoidal variation at frequency ω:

$$I_{applied} = j\omega V_T [(C_{1A} - C_{2A}) - (C_{1B} - C_{2B})] \quad (2)$$

Where $V_T$ is the voltage applied to the transmit electrodes.

From the above, it is evident that once the capacitances in the equivalent circuit are known, the parameters related to the transmission can be easily obtained. This will be helpful in designing a system, as the performance of the system can be calculated without physically building it. Furthermore, this model can be supplemented with the detailed electronics of the receiver and transmitter in order to, for example, determine the voltage required to apply across the transmit electrodes of a given size and geometry in order to transmit and receive a desired data rate over a desired range. These capacitances can be calculated from the geometry of the system and the theory of electrostatics, as discussed below.

In free space and in the absence of free charges, the static electric potential (V) produced by a set of electrodes satisfies Laplace's equation:

$$\nabla^2 V = 0 \quad (3)$$

Because we are only concerned with potentials that change in time, free charges do not generally enter into the calculation. This static solution is a good approximation when the voltage difference applied across a plurality of transmit electrodes is varied at such a rate that the resulting electric potential field varies in a quasi-static manner.

V is only determined to within an arbitrary constant which does not materially affect this calculation.

To find the capacitance between any two conductors $E_1$ and $E_2$ (this can be done for any of the capacitances in the equivalent circuit) perform the following calculation:

1. Set all conductors in the system to a potential of zero except $E_1$.
2. Set $E_1$ to a potential of v Volts.
3. Solve Equation 3 in the space around the conductors using the values of the potential at the surfaces of the conductors as Direchlet boundary conditions ($V = v|_{electrode}$)

(4). This can be done, for example, using finite element techniques. This determines the electric potential in the vicinity of $E_2$.

4. Determine the charge on $E_2$ due to the voltage (v) on $E_1$ by:

$$Q = -\oint\int_{electrode\ surface} \vec{\nabla} V \cdot d\vec{n} \quad (5)$$

(where $\bar{n}$ is the normal to the surface of the electrode). This can be evaluated from the results of the finite element calculation.

5. Determine the capacitance (C) between $E_1$ and $E_2$ from:

$$C = \frac{Q}{v} \quad (6)$$

This method can be repeated to determine all the capacitances in the equivalent circuit.

We have discussed a prototype system used to transmit a tag from a transmitter (for example, an employee badge) to a receiver. The prototype receiver displays the tag, although it can of course be sent to a security system for comparison against a database of known tags in order to determine whether access should be granted. The wireless transmission system of the invention has many other potentially useful applications, of which we will discuss a few examples.

Badge Microphone

As stated above, a transmitter can be built into a small area, for example an employee badge. Furthermore, such a badge can also conveniently include a microphone which produces an audio data signal to be transmitted. This would result in a short range badge microphone. Due to the limited transmission range, such a badge microphone will typically not be suitable for general purpose communications. However, such a badge microphone can conveniently be used to communicate with general purpose communication devices (e.g., telephones) equipped with a suitable receiver and a network connection. Thus a user's badge can be used to communicate with audio conferencing equipment. This can be advantageous as such a low power, low range wireless microphone can be located closer to a user's mouth than is typically the case for a handsfree speakerphone. This would decrease the reverberation or "barrel effect" so noticeable in handsfree speakerphone and teleconferencing applications. Furthermore, each participant can have such a badge microphone. In addition, if the microphone is assigned to a particular person (as in an employee badge), a telephone or teleconferencing system can transmit digital information as to who is talking (and anything else about the talker).

Local Device Communication

There are situations where it is advantageous for devices to know what other devices are close by. Examples include:

A television equipped with such a transmitter can transmit information such as preferred channels to a suitably enabled VCR so that this information need only be programmed into one or the other, not both.

A CD player can communicate with an amplifier so that it need not be switched from radio to CD when "play" is selected on the CD player.

A loudspeaker system can switch on and off loudspeakers depending on the physical location of the listener.

A computer can download directories to a desktop or mobile phone when the proximity of the devices is established.

This device communication embodiment is especially valuable for Internet Protocol (IP) devices. In these cases, the devices can use a short range transmitter/receiver according to the invention to transmit the Internet address of the device. When another IP device receives the address, communication can be initiated on an Internet connection. Such devices can thus have a constantly updated list of the IP enabled devices in close physical proximity.

Local Data Links

Local data links are currently commonly used to transfer data between:

1. A lap top computer and a desk top work station
2. A personal assistant and a computer
3. A telephone and a computer
4. Wireless computer mice and or wireless keyboards and a computer.

The current wireless solutions (including RF and infrared links such as IRDA) require close proximity, careful aim and/or power consumption levels incommensurate with the devices' power supplies.

The transmitter/receiver described herein may provide a more suitable data link for the applications listed above. It requires less power than the conventional solutions, and does not require special aim. Note that for these applications, it may be desirable to transmit base band if the coupling is strong enough.

We will now discuss additional techniques to enhance performance.

Automatic gain control (AGC) rather than the compression provided by the diodes would be a useful feature of the receive circuitry unit. AGC would allow the receiver to be used in a larger dynamic range of noise. AGC would also allow the receiver to receive the signal with the greatest amplitude (essentially the closest transmitter) when there are a number of transmitters close by.

Note that the receive circuitry will detect the total signal induced between the two electrodes, regardless of the sources. Generally we are only interested in detecting the signal induced by the transmitter. All other sources of electric potential gradients represent noise. The transmitted signal is first order (dipole) or higher which is generally much lower in amplitude than the zeroth order monopoles generated by lights, ballasts, motors and other electronic devices located in the vicinity of the receiver. The potential due to these monopoles decrease with range. Therefore, if one of the receive electrodes is closer to a monopole source than another receive electrode, a noise signal due to the monopole will be induced between these electrodes. In addition, local conductors can distort the monopole field close to the receiver to produce higher order terms which will be detected by the receiver as noise.

Also, the receiver is often connected to the mains supply, or a network. The ground of the circuit will determine the absolute potential of the receiver antenna making it particularly susceptible to monopole sources which are connected to the same ground.

Figure 12:
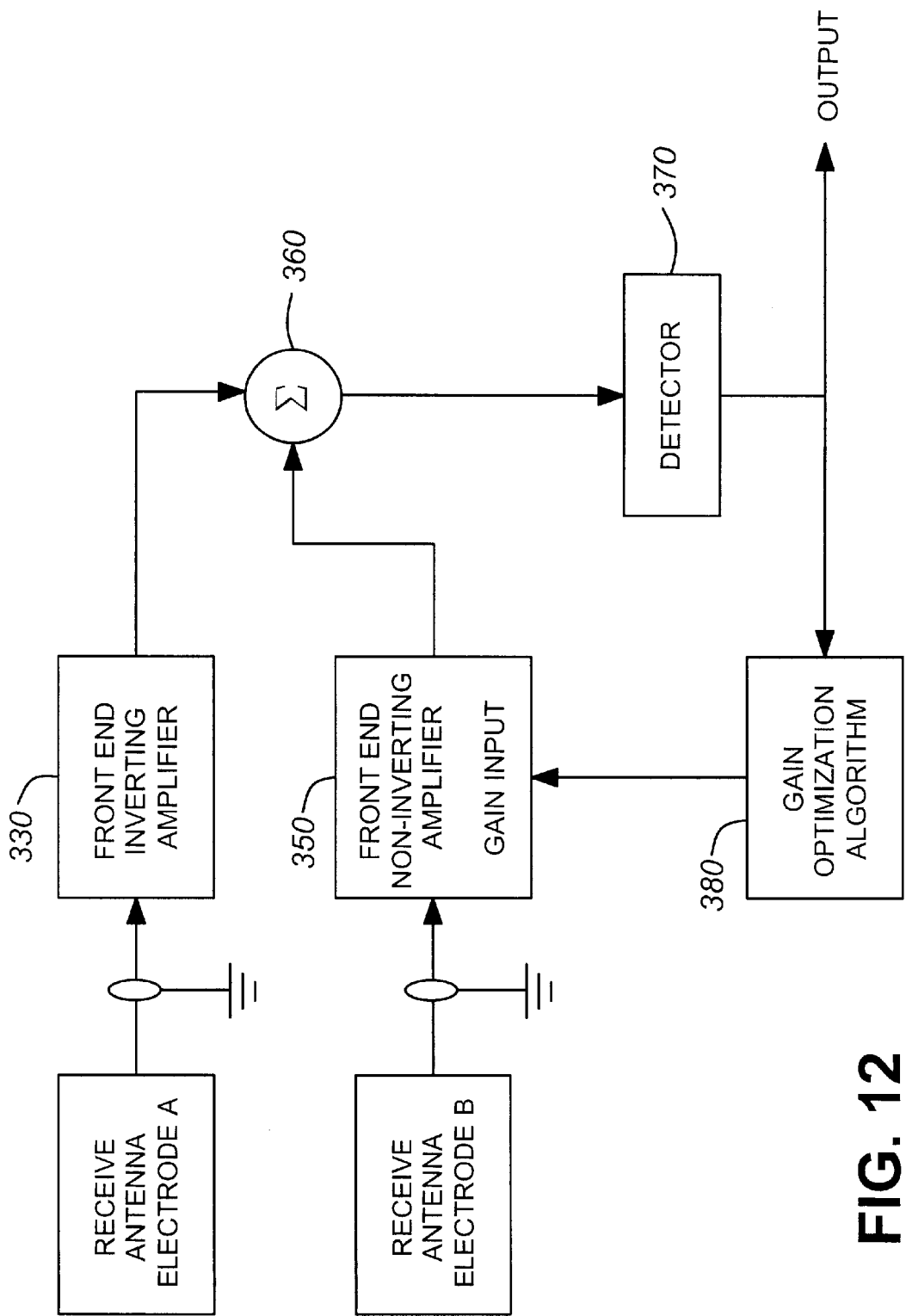
FIG. 12 shows a bock diagram of a receiver including a quiescent noise reducing system according to an embodiment of the invention.

FIG. 12 illustrates a receiver according to another embodiment of the invention which reduces the effects of these external noise sources. In this embodiment, the receiver circuit measures the currents required to hold each of the antenna electrodes at ground potential. Thus each electrode is connected to an amplifier 330, 350 as shown, which holds each electrode at ground potential, and produces an output corresponding to the current needed to keep the electrode at ground potential. These currents are amplified with different gains and then subtracted (for example by summer 360). This resulting signal is then demodulated by the detector 370, which can be a rolling phase detector as described. The relative gain difference is controlled by the gain optimization control unit 380. The average of these gains can be chosen to optimize circuit parameters such as signal to noise and the ratio of these gains is chosen to minimize the effects of signals which are not the transmitted signal. One way to determine what ratio of gains should be used is to continuously repeat the following steps:

1. Decrease the ratio of the gains by a small amount.
2. If this decrease results in a decrease in the noise, then the ratio should be further decreased, otherwise the ratio should be increased.

A common method of providing this type of control procedure is to modulate the gain ratio and phase sensitive detect the receiver output, which determines the average (over the modulation) value of the gain ratio.

As we have discussed, the received signal increases with the transmit antenna voltage difference. Voltage multipliers (including voltgage doublers) can therefore be used to strengthen the transmitted signal. Some of the inefficiencies associated with these circuits will be less important in this application because of the very low load represented by the antenna and the very small currents required by the transmit circuitry.

Note that the electric potential field generated by the transmit electrodes is intrinsically directional. However, as stated above, conductors in close proximity to the receive electrodes can distort the electrostatic field around the receiver. This is true for conductors which are coincidentally located in proximity to the receiver. In order to decrease the directional nature of the transmissions, other conductors can be deliberately located near the receiver in order to construct a transmission system which is largely independent of direction.

It is well known that dielectrics can amplify electrostatic fields in the same way permeable materials such as ferrites can amplify magnetic fields. Therefor, dielectric materials can be deliberately located around the electrodes in such a way as to enhance performance.

Note that we have described the detector with reference to an embodiment which used discrete components. However, a detector connected to said electrodes for producing a signal which varies as the spatial gradient of the electric potential field across the receive electrodes varies can be constructed using digital equivalents, can largely be incorporated in an ASIC. In addition, a DSP and/or microprocessor or other devices can be used to perform many of the functions described herein. This is true for the transmitter as well.

Numerous modifications, variations and adaptations may be made to the particular embodiments of the invention described above without departing from the scope of the invention, which is defined in the claims.

What is claimed is:

1. A method of data transmission comprising:

varying a voltage difference applied across a plurality of transmit electrodes at such a rate that the resulting electric potential field varies in a quasi-static manner, wherein the variation in said voltage difference depends on the data to be transmitted; and producing a receive output signal which varies with a signal induced between a plurality of receive electrodes by said quasi-static variations in said electric potential field;

wherein said step of producing a receive output signal comprises:

varying a current applied to said receive electrodes in order to keep the potential difference between said receive electrodes constant; and producing an output signal which varies with said varying current in order to recover the transmitted data.

2. The method as claimed in claim 1 wherein said step of varying a current applied to said receive electrodes in order to keep the potential difference between said receive electrodes constant comprises varying a current applied to each of said electrodes in order to keep each of said electrodes at a ground potential.

3. The method as claimed in claim 1 further comprising the steps of:

independently amplifying the induced signal from each receiver electrode and ground;

combining the outputs from each amplifier;

using the combined signal to adjust the gain of each amplifier in such a way as to increase the signal to noise ratio of the output signal.

4. The method as claimed in claim 1 wherein said step of varying a voltage difference applied across a plurality of transmit electrodes varies said voltage with a transmit oscillator frequency and wherein said step of producing an output signal comprises:

generating a plurality of oscillator signals from a local oscillator whose frequency is close to the transmit oscillator frequency, wherein each of said oscillator signals is phase shifted with respect to each other;

mixing said receive output signal with said plurality of oscillator signals;

low pass filtering each of said mixed signals;

processing each of said filtered signals with a non-linear characteristic which depends on the magnitude of the signal but does not depend on the sign; and combining each of the processed signals to produce a demodulated output signal.

5. A wireless transmission system comprising:

a wireless transmitter; and a wireless receiver;

wherein said transmitter comprises:

a plurality of transmit electrodes separated in space; and means for varying a voltage difference across said electrodes at a rate that the resulting electric potential field varies in a quasi-static manner, wherein the variation in said voltage difference depends on the data to be transmitted;

wherein said receiver comprises:

a plurality of receive electrodes separated in space; and means for producing a receive output signal which varies with a signal induced between said receive electrodes by the varying quasi-static electric potential field produced by said transmit electrodes;

wherein said means for producing a receive output signal comprises:

means for varying a current applied to said receive electrodes in order to keep the potential difference between said receive electrodes constant; and means for producing an output signal which varies with said varying current.

6. The system as claimed in claim 5 wherein said signal induced between receive electrodes results from capacitive coupling between said transmit electrodes and said receive electrodes when said electrodes are placed in proximity to each other.

7. The system as claimed in claim 5 wherein said means for varying a current applied to said receive electrodes in order to keep the potential difference between said receive electrodes constant comprises means for varying a current applied to each of said electrodes in order to keep each of said electrodes at a ground potential.

8. The system as claimed in claim 7 wherein said means for varying a current applied to each of said electrodes in order to keep each of said electrodes at a ground potential comprises:

means for independently amplifying the induced signal from each receiver electrode and ground;

means for combining the outputs from each amplifier; and means for using the combined output signal to adjust the gain of each amplifier in such a way as to increase the signal to noise ratio of the output signal.

9. A receiver comprising:

at least two electrodes separated in space; and a detector connected to said electrodes for producing a signal which varies as the spatial gradient of the electric potential field across the receive electrodes varies but which does not depend on changes in potential within any given electrode.

10. A receiver comprising:

at least two electrodes separated in space; and a detector connected to said electrodes for producing a signal which varies as the spatial gradient of the electric potential field across the receive conductors varies even when the potential is substantially constant at each point within any given electrode.

11. A receiver comprising:

at least two electrodes separated in space; and a detector connected to said electrodes for producing a signal which varies as the spatial gradient of the electric potential field across the receive electrodes varies;

wherein said detector comprises:

means for varying a current applied to said receive electrodes in order to keep the potential difference between said receive electrodes constant; and means for producing an output signal which varies with said varying current.

12. The receiver as claimed in claim 11 wherein said means for varying a current applied to said receive electrodes in order to keep the potential difference between said receive electrodes constant comprises means for varying a current applied to each of said electrodes in order to keep each of said electrodes at a ground potential.

13. The receiver as claimed in claim 12 wherein said means for varying a current applied to each of said electrodes in order to keep each of said electrodes at a ground potential comprises:

an amplifier coupled to each receive electrode for independently amplifying the induced signal from each receiver electrode and ground;

combining means for the outputs from each amplifier;

means for using the combined signal to adjust the gain of each amplifier in such a way as to increase the signal to noise ratio of the output signal.

14. The receiver as claimed in claim 11 wherein said detector further comprises a rolling phase detector for demodulating said receive output signal, and wherein the spatial gradient of the electric potential field is varied by a transmitter with a transmit oscillator frequency, wherein said rolling phase detector comprises:

a local oscillator whose frequency is close to the transmit oscillator frequency, for generating a plurality of oscillator signals;

a plurality of phase shifters for phase shifting said plurality of oscillator signals with respect to each other;

a plurality of mixers for mixing said receive output signal with said plurality of phase shifted oscillator signals;

a plurality of low pass filters for low pass filtering each of said mixed signals;

means for processing each of said filtered signals with a non-linear characteristic which depends on the magnitude of the signal but does not depend on the sign; and means for combining each of the processed signals to produce to a demodulated output signal.

15. The receiver as claimed in claim 14 wherein said means for processing includes means for squaring or means for rectifying.

* * * * *